July 5, 1932. G. A. SCHETTLER 1,865,542
MACHINE FOR AND METHOD OF OPERATING ON HIDES, SKINS
LEATHER, AND OTHER SIMILAR PIECES OF WORK
Filed May 15, 1928 10 Sheets-Sheet 1
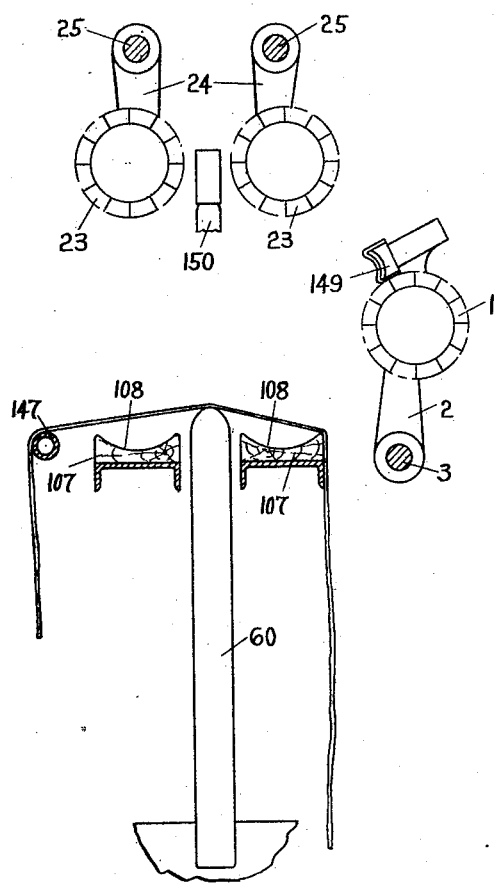
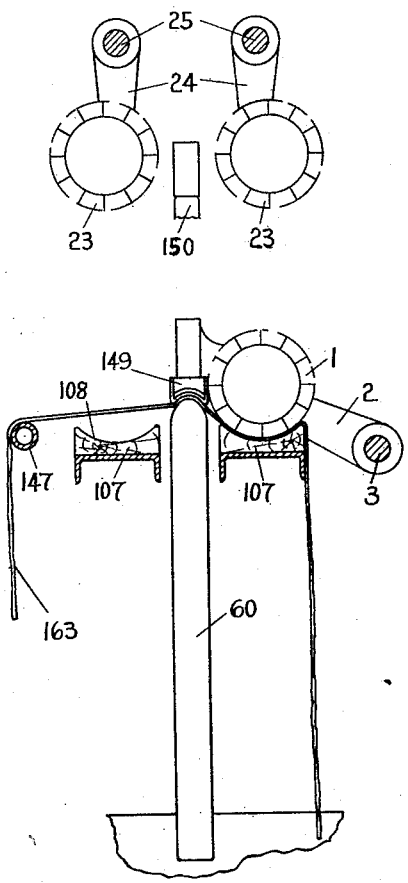
INVENTOR
Gustav A. Schettler
By his Attorney
Nelson W. Howard

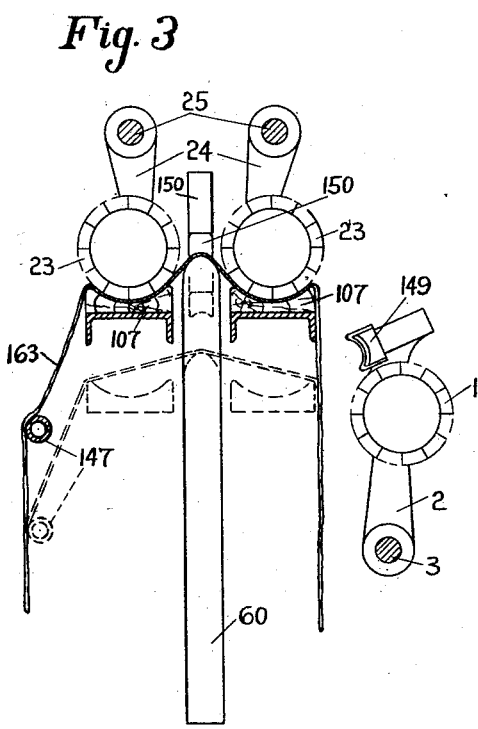
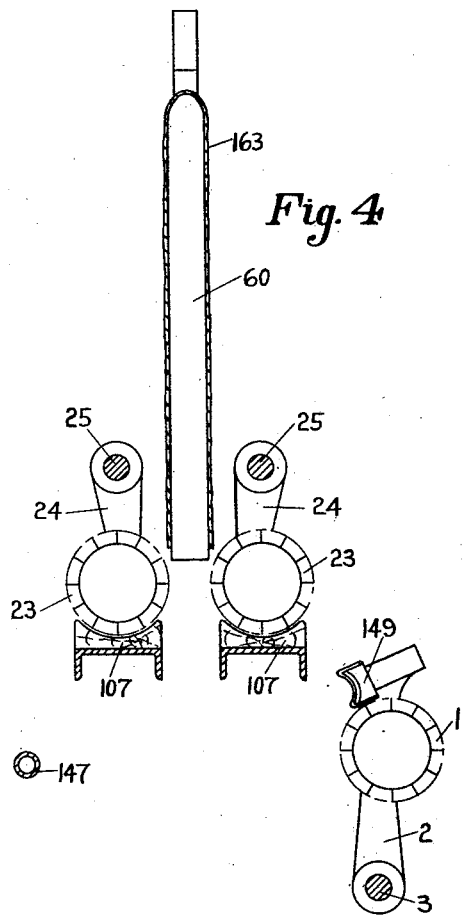

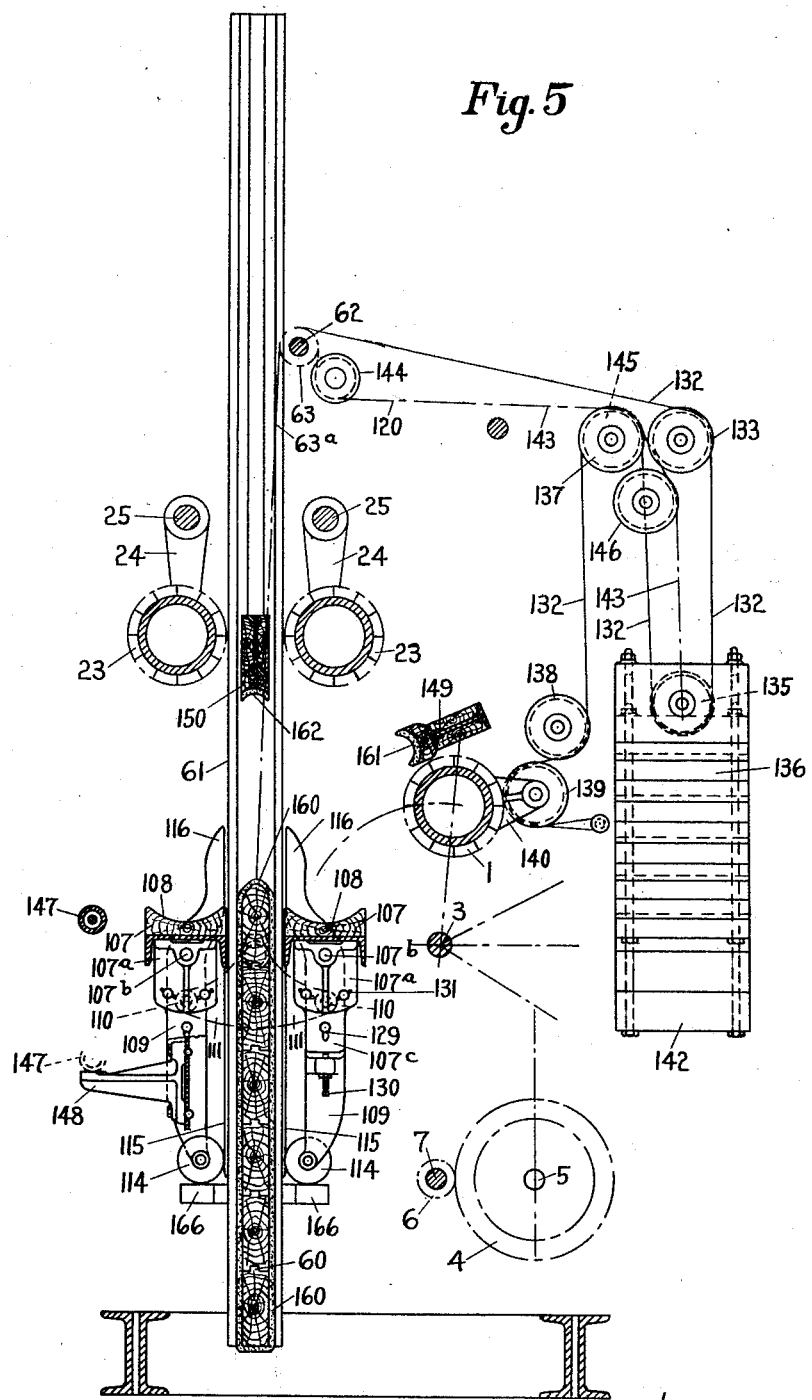

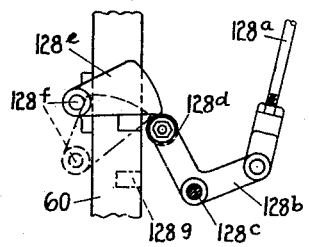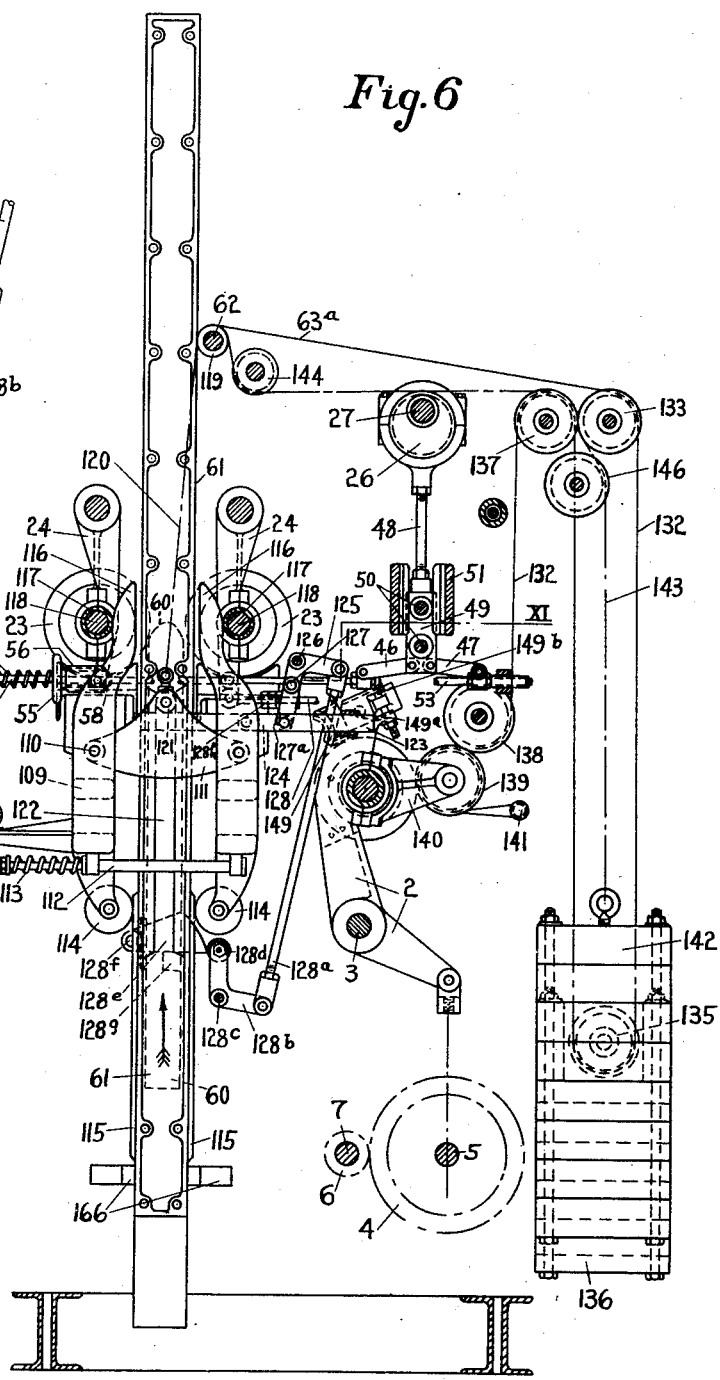

July 5, 1932.  G. A. SCHETTLER  1,865,542
MACHINE FOR AND METHOD OF OPERATING ON HIDES, SKINS
LEATHER, AND OTHER SIMILAR PIECES OF WORK
Filed May 15, 1928  10 Sheets-Sheet 5

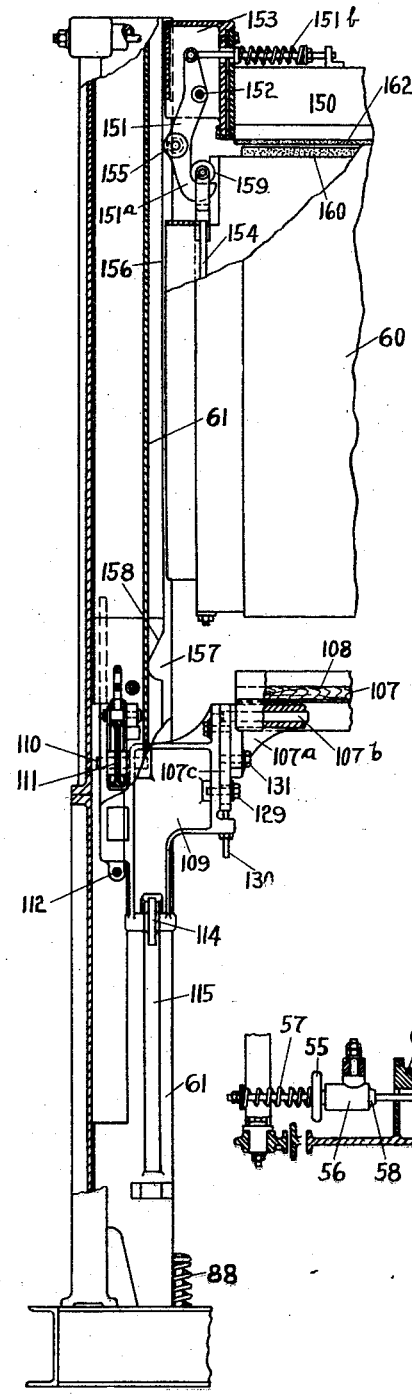
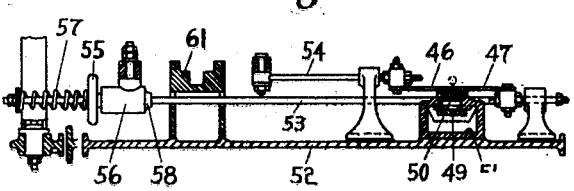

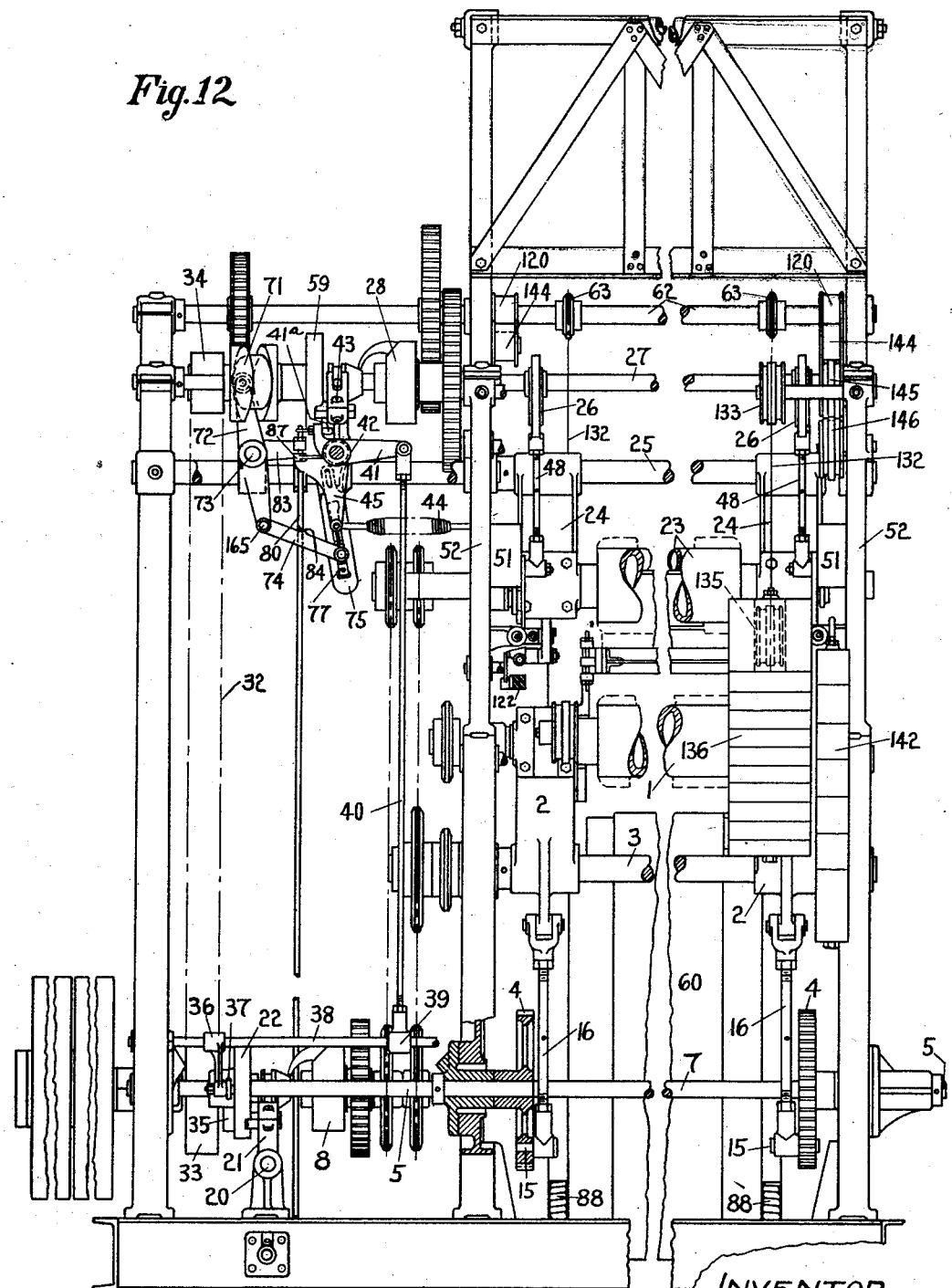

July 5, 1932. G. A. SCHETTLER 1,865,542
MACHINE FOR AND METHOD OF OPERATING ON HIDES, SKINS
LEATHER, AND OTHER SIMILAR PIECES OF WORK
Filed May 15, 1928 10 Sheets-Sheet 10

INVENTOR
Gustav A. Schettler
By his Attorney
Nelson H. Howard

Patented July 5, 1932

1,865,542

UNITED STATES PATENT OFFICE

GUSTAV A. SCHETTLER, OF LEEDS, ENGLAND, ASSIGNOR TO THE TURNER TANNING MACHINERY COMPANY, OF PORTLAND, MAINE, A CORPORATION OF MAINE

MACHINE FOR AND METHOD OF OPERATING ON HIDES, SKINS, LEATHER, AND OTHER SIMILAR PIECES OF WORK

Application filed May 15, 1928, Serial No. 278,030, and in Great Britain May 16, 1927.

This invention relates to machines for and methods of operating upon hides, skins, leather and other similar pieces of work and is illustrated as embodied in a machine for putting-out operations on hides, skins and pieces of leather. It is to be understood, however, that the invention and various important features thereof may have other applications and uses.

In certain types of putting-out machines as heretofore constructed, vertical tables have been provided over which skins were folded with the backbone line extending along the upper edge of the table so that when a piece of work was operated upon by bladed members arranged on opposite sides of the table the portion over the edge of the table remained untreated at the end of the operation. In certain other machines, a special mechanism was provided for shifting the table, or the bolster on the table, after treatment of the portions of work on the sides of the table by one set of treating tools so that the untreated portion on the upper edge of the table was brought into position for treatment in the succeeding operation by another set of tools provided for the purpose. In the operation of machines of the latter type, the parts of the work successively positioned over the edge of the table in the two successive operations received a single treatment, whereas the remainder of the work was operated upon twice. While machines of the types referred to have been in use for many years and have given results satisfactory to the trade in general, it is clear that a portion of each piece of work has either been left untreated or has received a considerably less amount of treatment than the greater part of the work.

It is an object of this invention to provide for the treatment of all portions of each hide, skin, or piece of leather in a manner suited to the requirements of each portion. It is a further object of the invention to provide an improved putting-out machine, while at the same time retaining all of the good features of prior constructions heretofore employed in putting-out operations.

To these ends and in accordance with an important feature of the invention, in its machine aspect, means is provided in the illustrated machine for operating first upon those portions of each hide, skin, or piece of leather, which are located along and closely adjacent to the backbone line of the hide, skin or piece of leather, other means being provided for operating subsequently upon the remaining portions only of each piece of work, so that each portion of the work receives proper treatment in one operation.

In prior types of machines, the only stretching of the median longitudinal portion of the work has been very largely, if not entirely, confined to directions at right angles to the length of the described longitudinal portion. It is an important feature of this invention that the median longitudinal portion of the piece of work which, in comparison with the other portions of the piece of work, is denser, with a firmer grain and with a greater resistance to stretching, is subjected to a stretching operation in a direction extending parallel to the backbone line of the piece of work and is, at the same time, given the usual putting-out treatment which is designed to stretch the work, to smooth out the grain surface thereof, and to remove as much moisture as possible with a view to accelerating the drying operation. This special stretching of the median longitudinal portion of the work, which may be continued until the desired results are obtained, has the advantage of extending the area of a portion normally very resistant to stretching, and of equalizing the substance with other portions of the piece of work, at least, to as great an extent as may be feasible or desirable.

For stretching the median longitudinal portion of the piece of work, the illustrated machine is provided with a concave work support with which a single bladed cylinder co-operates, the bladed cylinder acting to force the portions to be treated down into the concavity and to operate upon a strip of substantial width to effect the desired putting-out and stretching operations. Subsequently, the piece of work is shifted to bring the treated portion over the upper edge of a vertical table where it serves as the line of support for the untreated portions, and this table is caused to present the remaining portions of the work to treating tools designed to put-out the portions of the work on each side of the portion first treated, the part of the work first treated not being treated in the second operation. During the treatment of the work by the tools last mentioned the work is subjected to further stretching in a direction transverse of its median longitudinal portion because of the tension on the work effected by relative movement between the table and the treating tools. In the illustrated machine, the treating tools last mentioned are a pair of bladed cylinders which operate upon the work while it is backed by the table which moves up between the cylinders to present progressively different portions of the work for putting-out to the edges thereof along lines which extend at right angles to the first treated portion, work supports being also provided one on each side of the table for co-operation with the cylinders in effecting a preliminary putting-out operation and a tensioning of the work and a spreading of it in a direction parallel to the median longitudinal line of the piece of work before it is operated upon through the joint co-operation of the cylinders and the table.

In order that the piece of work may be maintained against displacement during operation on the median, longitudinal portion thereof, the illustrated machine is provided with a clamping member associated with the single cylinder to move with the latter into and out of clamping relation to the upper edge of a table over which the piece of work has been positioned. Subsequently the table and its associated work supports move upwardly to present the piece of work to the pair of cylinders already mentioned, shifting of the piece of work during upward movement of the table, so as to bring the treated portion over the edge of the table where it will not be operated upon a second time, being effected by means under the control of the operator. As the table rises it comes into contact with a clamping member, means controlled by movement of the table and of the clamping member operating to cause that member to clamp the work firmly on the table. In the illustrated construction, the means just described comprises connecting members between the clamping member and the table arranged to be operated by a stationary cam to effect the clamping pressure at a predetermined point in the upward movement of the table and to release the pressure upon return of the table and clamping member to the same point, the table subsequently returning to its initial position spaced from the clamping member so that the work may be removed.

It is also an important feature of the invention that the bladed cylinders which operate upon the work while it is backed by the table are rendered alternately operative and inoperative automatically in timed relation with respect to the feeding and reverse movements of the table. By reason of this arrangement the treating cylinders are in place ready for operating on the work when the table ascends between them, a further advantage being that the table may be reversed in its movement at the will of the operator to subject a given portion of the work to repeated operations if desired, it being understood that the treating cylinders are always moved to inoperative position before reverse movement of the table takes place and that they are moved to operative position before the upward movement of the table is resumed.

Another important feature of the invention resides in an improved arrangement by which the cylinders, operating upon the work backed by the table, may yield with respect to each other and the table so as to accommodate variations in the thickness of the work. In the illustrated construction, a yielding connection is provided between one of the cylinders and one of the links of a toggle which is operative to move the cylinders into and out of operative position. Preferably too, and as shown, provision is made for locking the cylinders in inoperative position so that by no chance may they be moved into contact with the work while they are intended to be in inoperative position.

It is desirable also that the work supports should be self-adjusting with respect to the pair of cylinders. Accordingly, the illustrated work supports are pivotally mounted upon beams at each end of the frame of the machine, the beams being in turn pivotally supported so that excess pressure on one work support is transmitted through the pivotal connections to the other work support and equalization takes place thereby effecting a balancing of the pressures between the cylinders and the work supports. As an additional means for securing proper co-operation between the pair of cylinders and their work supports, means is provided for aligning the position of the work supports with respect to the cylinders. Preferably, and as shown, this is accomplished automatically through connections which become operative during movement of the work supports to work-presenting position with respect to the cylinders.

Moreover, to facilitate operation of the machine, the construction and arrangement is such that upon initial depression of a treadle, the single cylinder moves into co-operative relation to one of the work supports and performs the described stretching and putting-out operation upon the median longitudinal portion of the piece of work, and upon a second depression of the same treadle, the single cylinder moves to inoperative position and simultaneously therewith the pair of cylinders move to operative position accompanied by upward movement of the table and work supports to co-operative relation with respect to the last-mentioned cylinders. Furthermore, the power means referred to is controlled by the table to the extent that at the termination of the upward movement of the table the power means is reversed to return the table to its lower position of rest, the table again operating when it reaches the last-mentioned position to stop the reversing movement of the power means and thus bring the table to rest.

These and other features of the invention and novel combinations of parts will now be described in detail and pointed out more particularly in the appended claims.

In the drawings,

Figs. 1 to 4 are respectively sectional views of the several work-operating components of the machine in various working positions;

Figs. 5, 6, 7 and 8 are end elevations partly in section illustrating details concerned with the work supports and setting cylinders;

Fig. 9 illustrates a detail hereinafter described and is drawn to a slightly larger scale.

Fig. 10 is a fragmentary side elevation partly in section of mechanism associated with the table and work supports;

Fig. 11 is a sectional plan on line XI—XI of Fig. 6;

Fig. 12 is a view in side elevation of the rear of the machine showing part of the driving and controlling mechanism of the machine;

Figure 7:
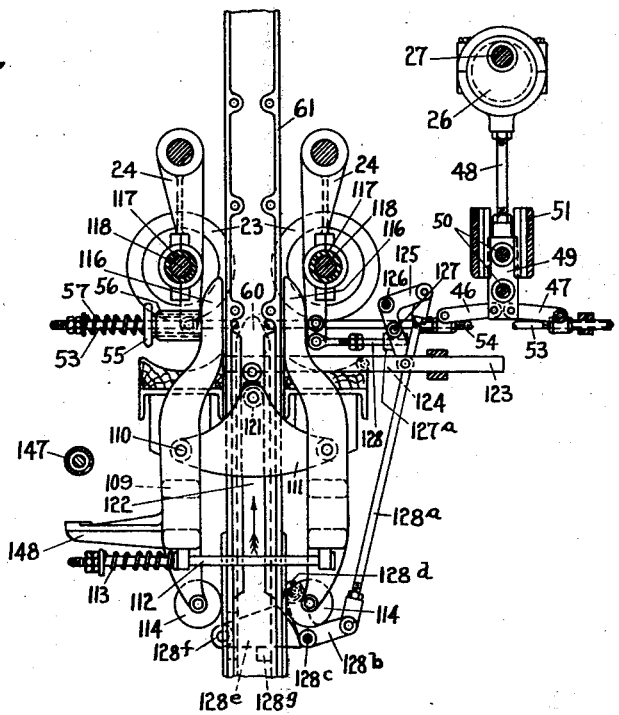

In the illustrated machine for performing putting-out, setting and stretching operations on hides, skins and pieces of leather, a cylinder 1 is carried at opposite ends by swing arms 2 (Figs. 1 to 6, inclusive) fulcrumed on a shaft 3 and actuated from gears 4 on shafts 5 (Fig. 12), each gear being driven by a corresponding pinion 6 on a clutch shaft 7. The clutch 8 on this shaft is driven from a primary shaft 9 (Figs. 13 and 15) by gearing 10, 11, and is put into operation upon depression of a treadle 12 (Figs. 14 and 15) fulcrumed at 13 and arranged to be returned to initial position by a spring 14. The arms 2 are connected with crank pins 15 in the gears 4 by connecting rods 16 (Fig. 12). The treadle is connected with a clutch fork 17 (Figs. 13 and 15) by a rod 18 (Figs. 14 and 15), arm 19, and rockshaft 20, which latter is furnished with another arm 21 (Figs. 12 and 13) which engage a half cycle stop disk 22 on the crank shaft 5, whereby the movement of the cylinder 1 is arrested as it reaches alternately operative and inoperative positions. It will be clear from the foregoing description that depression of the treadle 12 at the beginning of the operation of the machine results in movement of the cylinder 1 to the operative position disclosed in Fig. 2 and the cylinder remains operating in that position until the treadle is again depressed. The cylinder 1 is of the type wherein helical or spiral blades extend in opposite directions from a point at or near the middle of the cylinder, so that the stretching action takes place from the center of the backbone portion outwards towards the neck and tail respectively.

Figure 8:
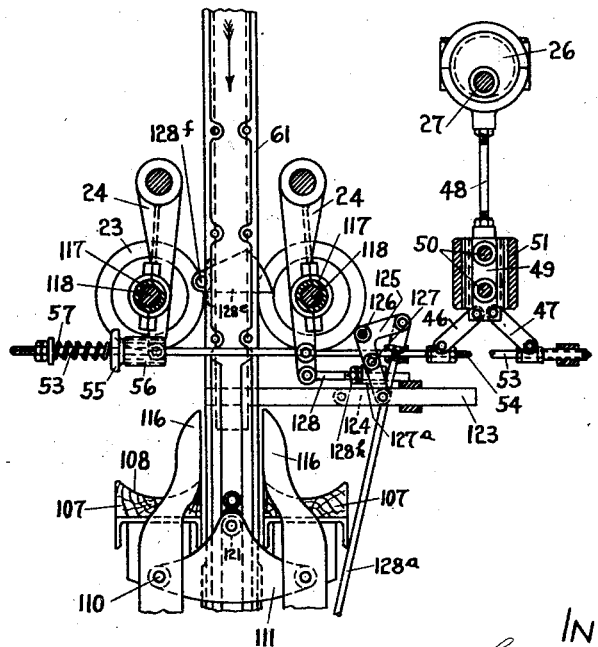

Located above the cylinder 1 are cylinders 23 which are also carried at opposite ends by swing arms 24 fulcrumed on shafts 25 and operated by eccentrics 26 (Figs. 6 and 12) on a shaft 27. This shaft is driven through the medium of a clutch 28 (Figs. 12 and 16) and gears 29, 30, from a shaft 31 (Figs. 13 and 16) which is driven in its turn by a belt 32 and pulleys 33, 34, (Fig. 12) from the primary shaft 9. Upon depression of the treadle 12 for the second time in the operation of the machine, the clutch 28 is put into action by a cam 35 (Fig. 13) on the stop motion disc 22, through intermediate connections (Figs. 12 and 13) comprising an arm 36, furnished with a roll 37 and mounted on a rockshaft 38, an arm 39 on the rockshaft, a connecting rod 40, an arm 41 freely mounted on a cross shaft 42, and a clutch fork 43. The arm 41 acts on the clutch fork 43 by means of a pin 41a therein. The clutch fork 43 is keyed on the cross shaft 42 and is normally held with the clutch inoperative by a spring 44 connected to an arm 45 also keyed on the cross shaft adjacent to the fork 43. Referring to Figs. 6, 7, 11, and 12, each of the eccentrics 26 on the shaft 27 operates the corresponding cylinder-supporting swing arm 24 through intermediate connections which comprise toggle links 46, 47 connected to the eccentric rod 48 by means of a link 49 pivotally connected to 48 and fitted with cam rolls 50 adapted to work in a guide 51 fixed on the adjacent end frame 52 of the machine. The toggle link 47 is connected with the swing arm of the left-hand cylinder 23, as viewed in Fig. 6, by a rod 53 and the toggle link 46 is connected with the swing arm of the other, i. e. right-hand cylinder by a rod 54. Hence, the second depression of the treadle 12 results in movement of the cylinders 23 to operative position. The rod 53 extends through a handwheel 55 (see also Fig. 14) screwed into a boss 56 on the corresponding swing arm, and is furnished with a spring 57 on one side of the wheel and a collar 58 on the other side, the spring being for the purpose of providing for the application of yielding pressure upon the arms 24 and hence of the cylinders 23 upon the work. When the cylinders occupy the operative position, as shown in Fig. 6, the upper of the cam rolls 50 of each link 49 is located in the corresponding guide 51 and the lower cam roll is outside the guide, so that the links 49 are free to swing to a slight degree with the upper cam rolls as fulcrums. By reason of the construction and arrangement aforesaid the cylinders 23, when operative, are free to oscillate slightly independently of each other, in accordance with variations in the thickness of the work. The handwheel 55 is provided for effecting relative adjustment of the cylinders 23 in accordance with requirements. Upon movement of the cylinders to the inoperative position all the cam rolls 50 take up a position within the guides 51 as shown in Fig. 8, so that the links 49, and consequently the cylinders, are held rigid. A half cycle stop disc 59 is provided on the shaft 27 to control the fork 43 so that the shaft makes half a revolution every time the clutch is put into operation, and stops with the cylinders either in the operative or in the inoperative position as the case may be.

Figure 16:
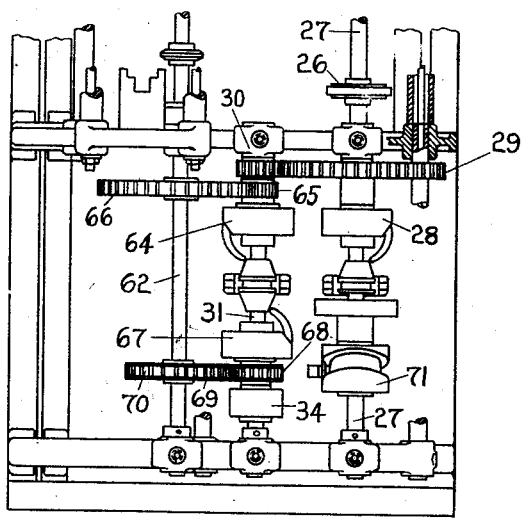
Fig. 16 is a sectional plan on line XVI—XVI of Fig. 14.
Figure 17:
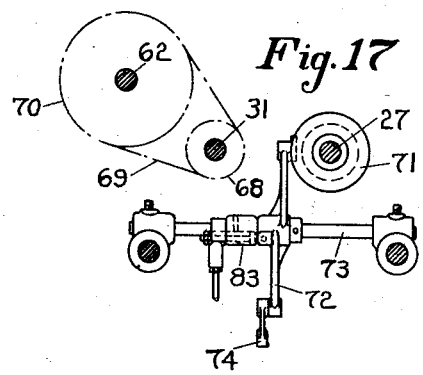
Figs. 17 and 18 illustrate details of a trip mechanism hereinafter described.

A table 60 (Figs. 1 to 6, 10 and 12) for backing a piece of work against the thrust of the cylinders 23 and for feeding the work past the cylinders, is arranged to slide vertically between guides 61 at opposite ends of the machine. The table 60 serves with work supports 107 as the work supporting means for presenting the work to the cylinders 23. During its upward movement past the work supports 107, and past the cylinders 23, the table 60 backs the piece of work against the thrust of the cylinders 23 in putting-out operations on the work, while during this time the cylinders in cooperation with the work supports 107 spread the work, tension it and give it a preliminary putting-out operation. This table is suspended at each end, from a shaft 62 (Fig. 5) by means of a sprocket 63 fixed on shaft 62 and a chain 63a driven by said sprocket and represented diagrammatically in Fig. 5, said shaft being driven first in one direction and then in the other to impart up and down movement to the table. The drive for moving the table upwards is transmitted from the shaft 31, upon the second depression of the treadle 12 as hereinbefore referred to, by means of a clutch 64 (Figs. 14 and 16) and intermediate gears 65 and 66, the latter being fixedly carried by shaft 62. For driving the shaft in the opposite direction we provide another clutch 67 on the shaft 31 and intermediate chain 69 and sprocket gears 68 and 70, the latter being fixedly carried by shaft 62 (Figs. 16 and 17). The clutches 64 and 67 are controlled by means of a cylindrical cam 71 (Figs. 12 and 16) fast on the clutch shaft 27 and intermediate mechanism including a compensating arrangement whereby the positive connection between said cam and the intermediate clutch shipper mechanism is automatically broken as soon as the table reaches its initial position of rest, and restored when the table is to be moved upwards.

Figure 18:
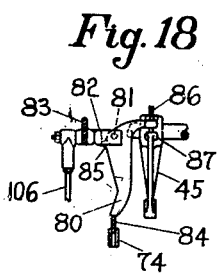

Conveniently such intermediate shipper mechanism comprises a lever 72 (Figs. 12 and 17) adapted to rock on a cross bar 73 and connected by a link 74 with a lever 75 (see also Fig. 13) freely mounted on the cross shaft 42 and in engagement with a clutch fork 76. The connection between the levers 72 and 75 is a breakable one and to this end the link 74 is attached to a block 77 which is slidable in a slot 78 in the lever 75 and controlled by a pair of tension springs 79. Normally the positive connection is broken, that is to say, the link 74 is normally held in the position shown in Fig. 12 against the action of the springs 79 (Fig. 13) by a trip lever 80 (see also Fig. 18) fulcrumed at 81 in a member 82 carried by an arm 83 freely mounted on the cross bar 73. The link 74 has a shoulder 84 thereon for engagement by the lower end of the lever 80, and the latter has a shoulder 85 for abutment upon the member 82 to prevent the trip lever 80 from turning under the upward thrust of the link 74 due to the pull of the springs 79. The trip lever 80 is also furnished with a pin 86 for engagement by a shoulder 87 on the arm 45 hereinbefore described, whereby the lever 80 can be tripped to release the link 74 when it is required to restore the aforesaid positive connection. It will be recalled that upon the second depression of the treadle in an operation of the machine the clutch 8 is rendered operative for the second time and, as a result, the cylinder 1 is returned to its initial position of rest. As the clutch shaft 7 commences to rotate, the cam disk 35 (Fig. 13) on the disk 22 operates to put the clutch 28 (Figs. 12 and 16) into action and thus sets the eccentric shaft 27 in motion. At the same time the lever 45, by reason of the engagement of the shoulder 87 thereon with the pin 86 in the trip lever 80, trips the latter so that the link 74 is freed to move upwardly from the normal position shown in Fig. 12 under the action of the springs 79 (Fig. 13) until a stop screw 164 in the link 74 makes contact with the wall at the upper end of the slot 78 (Fig. 13) in the lever 75. When this occurs the connection formed between the lever 72 and the lever 75 is rendered positive. The cam 71 which rotates with the shaft 27 actuates the lever 72 which, through the connections just described, together with the fork 76, throws in the clutch 64 whereby the shaft 62 is set in motion. Upon initiation of rotation of the eccentric shaft 27 the eccentrics 26 operate through the described connections to move the setting cylinders 23 into operative position and at the same time the table 60 starts upwardly toward a position where it will cooperate with the setting cylinders and with work supports, as will be hereinafter described.

The table 60 initially rests on buffer springs 88 (Figs. 10 and 9) suitably mounted in the machine frame. Means are provided for automatically putting the clutch 28 into action when the table reaches the top of its stroke to move the cylinders 23 into operative position and through the medium of the cam 71, lever 72 and clutch 67 reverse the movement of the table. For this purpose a cam 89 (Fig. 14) is fixed on one edge of the table, and this cam actuates connections arranged on the upper part of the machine between it and the cross shaft 42 on which the fork for the clutch 28 is keyed as already mentioned herein. These connections may comprise a lever 90 fulcrumed at 91 on the adjacent table guide 61, and connected by a link 92 with a bell crank lever 93 (see also Fig. 13) fulcrumed at 94 on a bracket attached to the adjacent side frame 52 of the machine and connected with an arm 95, keyed on the cross shaft 42, by a rod 96. The upper limit of the movement of the cam 89 is represented by dotted lines in Fig. 14. The lever 90 is furnished with a roll 97 which is normally held in the path of the cam 89 by the clutch spring 44 acting through the connections aforesaid. Movement of the shaft 42 by lever 90 through the connections described results in throwing in the clutch 67 whereby reverse movement of shaft 62 and downward movement of table 60 is secured.

Provision is also made for operating the aforesaid clutch manually, so that the operator may reverse the movement of the table at will, the arrangement being such that the cylinders 23 are moved to inoperative position before the table starts downwardly. For manual operation of the clutch 67 there is provided an arm 98 (Figs. 13 and 14) on the cross shaft 42 and connected to this arm a horizontal handle or rail 99 which can be reached and operated from any position at the front of the machine. It will be observed that cylinders 23 are moved to operative position before the table 60 starts up from its initial position or from an intermediate position determined by manipulation of the handle 99. Hence it is clear that the cylinders are rendered operative and inoperative automatically in conjunction with the feeding and reverse movements of the table. Through proper manipulation of the handle 99, a given portion of a piece of work may be operated upon repeatedly if desired.

Figure 13:
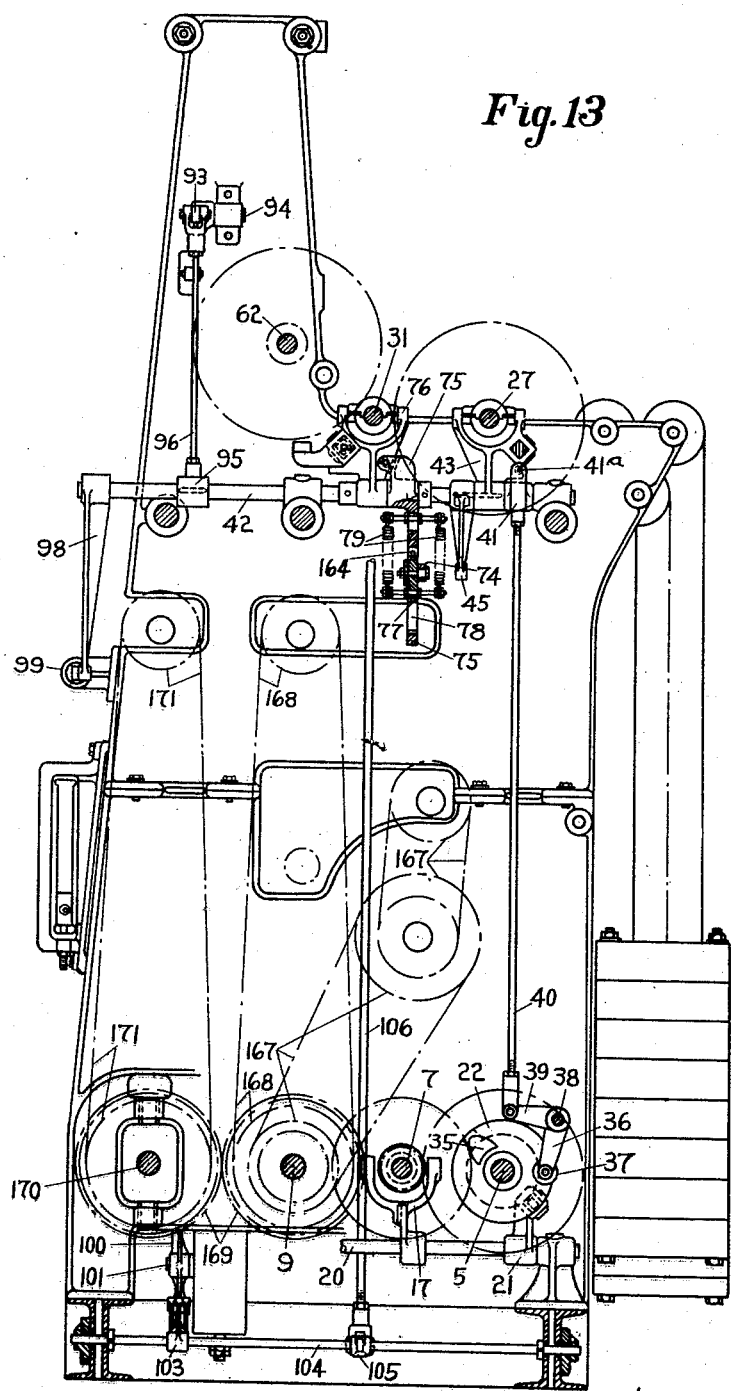
Fig. 13 is an end elevation partly in section of the machine as viewed from the left of Fig. 12.
Figure 14:
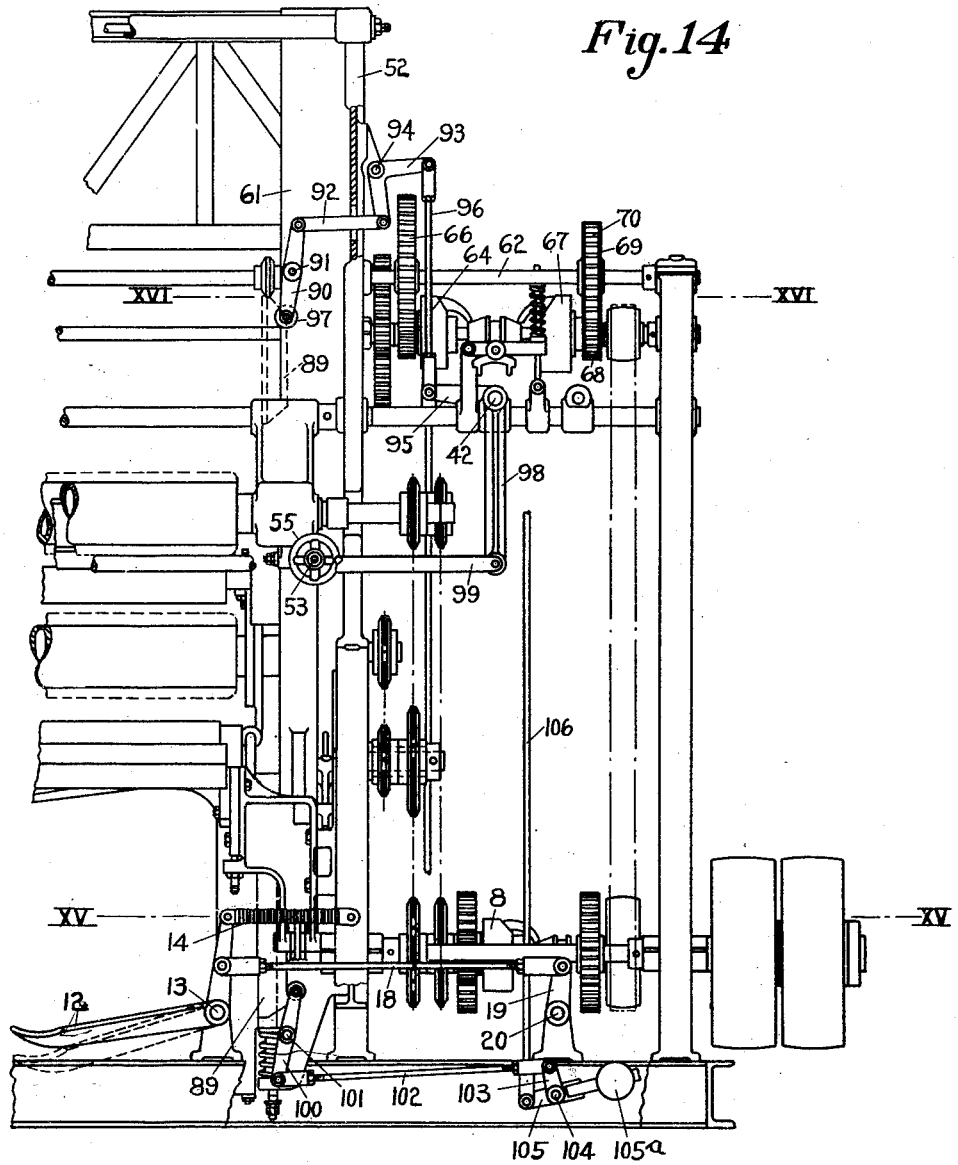
Fig. 14 is an elevation of other parts of said mechanism as viewed from the front of the machine.
Figure 15:
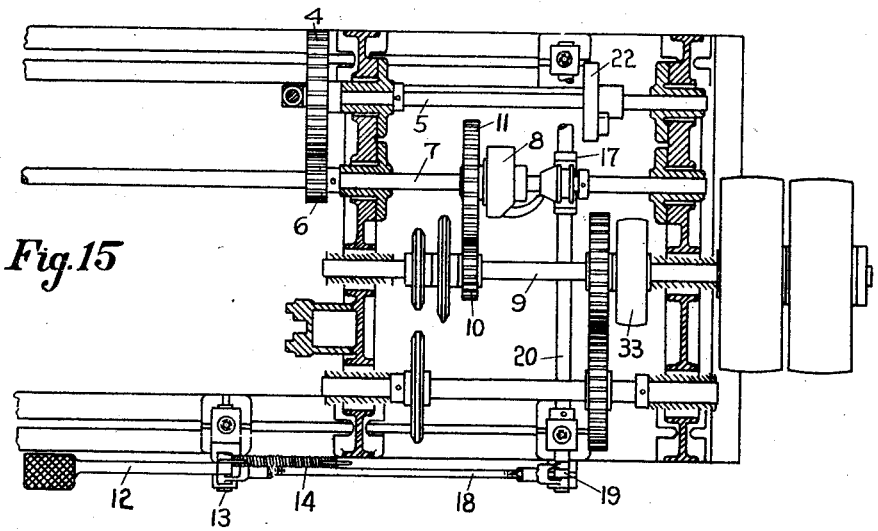
Fig. 15 is a sectional plan on line XV—XV of Fig. 14.

At the lower part of the machine adjacent to the main driving mechanism, connections are provided for automatically breaking the positive connection between the levers 72 and 75, hereinbefore referred to, when the table reaches its initial or normal position of rest. Such connections are also actuated by the cam 89, and, as shown in Figs. 13 and 14, conveniently comprise a lever 100, fulcrumed at 101 on a suitable support and connected by a rod 102 with an arm 103 on a rockshaft 104. This rockshaft is furnished with another arm 105 which carries a counterweight 105a and is connected by a rod 106 with the arm 83 carrying the trip lever 80. It will be understood that by reason of the half cycle movements of the shaft 27 the cam 71 moves the lever 72 to a definite position in one direction or the other and then stops. Therefore, upon movement of the lever 72 to cause reverse movement of the shaft 62 and descent of the table 60, the lever 72 stops with the clutch 67 in connection and some means must be provided for throwing out this clutch independently of the lever 72 to stop the descent of the table at the required time. It is for this purpose that the compensating mechanism, above described, is provided. As the table approaches the end of its downward movement the cam 89 carried by the table operates the lever 100 which, through the connections already described, pulls down the rod 106 and the arm 83, thereby causing the lever 80 to press upon the link 74. Since the lever 72 is held rigid by the cam 71 the link 74 moves downward about a pivot point 165 under the pressure of the trip lever 80 and against the action of the spring 79 and thereby operates the lever 75 and, perforce, the clutch fork 76, to throw the clutch 67 out of action and thus bring the table 60 to rest. This is accomplished just as the table 60 reaches the buffer springs 88 (Fig. 12).

Referring again to Figs. 1 to 10, the work is held up to the cylinders 23 by means of work supports 107 constituted by horizontal bars having hollowed or concave faces 108 to suit the circumferences of the working cylinder. While the work supports 107 are stationary in their initial positions of rest, they support the work and one of them cooperates with the cylinder 1 in an operation on the median longitudinal portion of the piece of work. Later the supports 107 become movable to carry the work upwardly to present it to the cylinders 23. These bars are attached at opposite ends to brackets 107a (Fig. 5) by pins 107b and the brackets 107c mounted on are clamped upon plates rocker arms 109 fulcrumed at 110 upon the extremities of the centrally suspended beams 111. At each end of the work supports 107, the opposing rocker arms are connected by yielding means comprising a rod 112 (Figs.

6 and 10) furnished with a spring 113 which tends to move the supports apart, such movement being limited by the contact of rollers 114 fitted in the free ends of the rocker arms with corresponding machined faces 115 on the opposite sides of the guides 61 hereinbefore referred to, wherby the supports are guided in their vertical movement.

Further, said rocker arms 109 are formed or provided with extensions 116 having beveled or curved edges for engagement with sleeves 117 on shafts or trunnions 118 of the setting cylinders 23, as represented in Fig. 6, when the supports 107 are moved up to the said cylinders, whereby the supports are caused to adjust themselves relatively to the cylinders 23, i. e., by movement upon the fulcrums 110. By means of this arrangement, the pressure of the cylinders 23 on the work supports 107 is equalized. The beams 111 are suspended from the same shaft as the table, i. e., the shaft 62, and are moved up and down by means of pulleys 119 (see also Fig. 12) and friction bands 120 one of which is represented diagrammatically in Fig. 6. Normally the work supports 107 occupy a position adjacent to the upper edge of the table when the latter occupies its initial position (Fig. 5). The said beams 111 are fitted with rollers 121 which work in guideways 122 (Figs. 6 to 8) and under these rollers 121 slide bars or bolts are, at the proper time, automatically positioned to lock the work supports in working relation with the cylinders 23, as will now be described.

Conveniently there is provided for each beam 111 a bolt or bar 123 (Figs. 6 to 8) slidable through the adjacent guide 61 and connected by a link 124 with a bell crank lever 125 suitably fulcrumed at 126. This lever has jointed to it at 127 a collar 127a through which is slidable a rod 128 connected to one of the swing arms 24, i. e., the right-hand arm as viewed in Figs. 6 to 8. The bell crank lever 125 is connected by a rod 128a to another bell crank lever 128b, suitably fulcrumed at a fixed point 128c and furnished with a roll 128d for engagement by a cam 128e (see also Fig. 9) on the table 60. The cam 128e is adapted to swing for a purpose hereinafter set forth and, consequently, is fulcrumed at 128f on the table 60 and normally rests on a stop 128g. An adjustable abutment constituted by nuts 128h is provided on the rod 128 between the arm connected thereto and the collar 127a for contact with the latter for withdrawing the bolt 123. The arrangement is such that the slide bar or bolt 123 is rendered active by the cam 128e on the table when the table rises after the cylinders 23 have been moved into operative position, but not before the work supports reach said cylinders, and is withdrawn when the cylinders 23 are rendered inoperative, i. e., before the table and work supports fall. Referring more particularly to Fig. 7, upon movement of the cylinders 23 into operative position, the rod 128 slides through the collar 127a (compare Figs. 7 and 8) so that the bar or bolt is not affected. The table 60 and work supports 107 then rise, as indicated by the arrow (Fig. 7), and as the work supports 107 approach the cylinders 23 the cam 128e on the table 60 commences its action upon the lever 128b being fully active thereon when the work supports reach the cylinders so that the bars or bolts 123 are pushed under the rollers 121, as represented in Fig. 6, to lock the beams 111 and hence the work supports 107 in co-operative relation with the work pressed against the cylinders 23. To effect locking movement of the bar 123, the collar 127a slides on the rod 128 up to and presses against the abutment 128h to move the bar to locking position. Since the work supports 107 are carried by rocker arms 109 fulcrumed on the beams 111 which in turn are pivotally supported by rollers 121 resting on the lock bars 123, the beams may tip under excessive pressure upon one work support 107 and thus equalize the pressure of both supports 107 against their respective cylinders 23. The table 60, of course, continues its upward motion for the putting-out operation. When the cylinders 23 are returned to their initial or inoperative position (Fig. 8), the abutment 128h immediately acts upon the collar 127a to withdraw the bolt before the table 60 and work supports 107 commence to move downwards in the direction of the arrow. Obviously when this occurs the lever 128b is moved into the path of the cam 128e again, and it is in order to allow the cam to pass the lever, during its downward movement, that the cam is fulcrumed on the table. Thus when the cam 128e reaches the roller 128d (see the full lines in Fig. 9), it is turned upon its fulcrum, as represented by the dot and dash lines, and is able to pass the roller. As soon as the cam has passed the roller it drops back on to the stop 128g.

The plates 107c (Fig. 5) are attached to their rocker arms 109 by screw and slot fastenings 129 so that the work supports 107 can be adjusted, e. g., by set screws 130 to compensate for wear of the cylinders. The brackets 107a are also clamped to the plates by screw and slot fastenings 131 (Fig. 5) so that the brackets can be turned on the pins 107b to set the bars correctly with respect to the circumferences of the cylinders.

Balance weights are preferably provided to counterbalance the weight of the table 60, cylinder 1, and work supports 107. Conveniently the table and cylinder 1 are counterbalanced by the same weights by suitable connections thereto, while the work supports 107 are counterbalanced by separate weights. As represented diagrammatically in Figs. 5 and 6, each of the chains 63a for the table 60 is connected to a cable 132 which passes by way of a guide pulley 133 (see also Fig. 12) round a pulley 135 mounted in a weight member 136 and thence round further pulleys 137, 138 and 139, the latter of which is mounted upon a bracket 140 attached to the adjacent swing arm 2 of the cylinder 1, after which the cable is anchored to a fixed bar 141. In this way both the table 60 and the cylinder 1 are counterbalanced. For balancing the work supports 107, each friction band 120 is connected with a weight 142 by a band 143, as represented diagrammatically in Figs. 5 and 6, said band being passed under a guide pulley 144 and over pulleys 145 and 146 (see also Fig. 12). Since the movement of the work supports 107 is imparted frictionally, their upward movement is arrested as soon as the supports take up a position in predetermined relation to the pair of cylinders with the counterweights resting on the floor or some other support so that the friction on the shaft 62 is relieved. As shown in Fig. 5, stops 166 are provided on each guide 61 for engagement by the rollers 114 to determine the initial position of the work supports 107.

The member on which the work is held by the operator to centralize it with respect to the upper edge of the table 60 conveniently consists of a horizontal rod or tube 147 (Figs. 2 to 6) slidably mounted for vertical movement in the machine frame and movable by arms 148 projecting from the corresponding rocker arms 109 of the work supports 107 at the front of the machine. A certain amount of lost motion is, however, provided for to allow the rod or tube 147 to remain stationary until the work has been centralized with respect to the table 60, after which the rod or tube moves in company with the arms 109 and the work supports 107 in order to avoid excessive displacement of the work.

A clamp bar 149 (Figs. 1 to 6) associated with the cylinder 1 is carried by the same swing arms 2 as the cylinder so that when the latter is operated the clamp bar moves in company therewith into and out of engagement with the work over the forward or upper edge of the table. In this way the work is clamped upon the table 60 while the cylinder 1 operates on the portion of the work resting upon one of the work supports 107. The clamp bar is fulcrumed at 149a (Fig. 6) in the swing arms and adjustable by screws 149b. When the clamp bar is brought into working position the table yields against the action of the buffer springs 88, the pressure being thereby regulated and damage to the work avoided.

Another clamp bar 150 (see also Fig. 10, wherein the table 60 is shown in the fully raised position) is mounted horizontally and is movable vertically in the guides 61 to co- operate with the upper edge of the table to hold the work against displacement during operation of cylinder 23. Said bar is fitted at each end with a lever 151 (Fig. 10) fulcrumed at 152 in a slide 153 which is attached to the end of the clamp bar to work in the guide 61. The lever has a hooked extremity 151a, and is actuated by a cam (presently to be described) when the bar 150 is engaged and moved upwards by the table 60, so as to engage a vertical bolt 154 fitted slidably in the adjacent end of the table and by wedging action thereon create pressure between the bar and the upper edge of the table. Conveniently the lever is furnished with a roller 155 which runs on a track 156 in the guide 61, said track being formed with a recess 157 in which the roller is normally located to determine the normal position of the clamp bar and the lever and the aforesaid cam is constituted by an incline 158 above the recess. It will be understood that the hook-like extremities 151a of the levers 151 are normally held clear of the bolts at opposite ends of the clamp bar. When the clamp bar is pushed upwards by the table the rollers first travel up the incline cams 158 and consequently the hook-like lever extremities are moved inwards against the action of lever springs 151b, to engage the table bolts 154. During the continued movement of the table and clamp bar the rollers travel on the tracks in the guides 61 to maintain the engagement between the levers and bolts. Each of the said hooked extremities 151a engages under a roller 159 fitted at the upper end of the adjacent bolt 154, the roller engaging surface being slightly inclined to impart the aforesaid wedging action. Upon the reverse movement of the table 60, the bar 150 is drawn down thereby until the rollers come opposite the recesses, whereupon the levers are turned outward by their springs to press the rollers 155 into the recesses 157 whereby the movement of the bar 150 is arrested and the bar and table are disconnected so that the latter continues its movement independently to its initial position. The table bolts 154 may be fitted with springs (not shown) to regulate the pressure between the table and the clamp bar.

The table 60 and clamp bars 149, 150 may be made of wood and provided, respectively, with facings 160, 161 and 162, of leather, though other suitable material may be used to avoid damage to the work.

The working cylinders 1 and 23 are driven at the required working speed, whether in or out of working position, through the medium of chain or other gearing. As shown, the cylinder 1 is driven from the primary shaft 9 by chain and sprocket gear 167 (Fig. 13) and the drive is transmitted from said shaft to one cylinder 23 by chain and sprockets 168, and to the other cylinder 23 by gears 169, shaft 170, and chain and sprocket gear 171.

If desired, a set of slicking tools or equivalent means together with another pair of cylinders (not shown) may be arranged above the cylinders 23 and suitably actuated for further treatment of the work.

The operation of the machine may be briefly recapitulated as follows: Normally the cylinder 1, cylinders 23, table 60, work supports 107, and clamp bars 149 and 150 occupy the relative positions represented diagrammatically in Fig. 1. The work is thrown over the table 60, work supports 107, and bar 147, with the backbone line of the hide or skin at one side and parallel to the upper edge of the table. Upon depression of the treadle the clutch 8 is put into action and the cylinder 1 and its clamp bar 149 are moved into operative position (Fig. 2) by the mechanism already described so that the backbone portion of the hide or skin 163 which is located over the work support 107 on the same side of the table as the cylinder 1 is bedded down in this support and stretched and otherwise put-out. The half cycle stop disk 22, which rotates in the direction of the arrow (Fig. 13) operates to throw the clutch 8 out of action when this position is reached, so that the cylinder 1 remains in operation for as long as the operator deems necessary.

Upon a second depression of the treadle, the clutch 8 is again rendered operative and the cylinder 1 and clamp bar 149 are returned to their normal or inoperative position. As the clutch shaft 7 commences to rotate for this purpose the cam 35 (Fig. 13) on the disk 22 operates to put the clutch 28 (Figs. 12 and 16) into action and thus sets the eccentric shaft 27 in motion. Upon the initial rotation of the eccentric shaft 27 the eccentrics 26 which are normally at the upper limit of their stroke operate through the associated connections to move the cylinders 23 into operative position, shown in Figs. 3, 6 and 7. The table 60 and work supports 107 also move upward to co-operate with these cylinders, as represented in Fig. 3, by reason of the rotation of the shaft 62, and each bar or bolt 123 is rendered operative. As previously explained herein, these movements are, however, so timed that the work supports 107 reach the cylinders 23 before the bolt 123 takes up its locking position so that it can pass under the roller 121 on the beam 111 to afford positive support for the latter. During the upward movement of the work supports 107, the operator presses the work against the bar 147 over which it was thrown at the same time that the work was placed upon the work supports 107 and the table 60. By thus holding one edge of the work stationary it is caused to shift laterally with respect to the work supports 107 and the upper edge of the table 60, thus bringing the treated backbone portion of the work over the upper edge of the table 60. In order that this lateral movement of the work may be conveniently terminated, the bar 147 is picked up at the proper time by the projections 148 on the arms 109 and carried along with the work supports 107. Since this terminates relative movement between the bar 147 and the work supports 107 no further lateral movement of the piece of work takes place. Subsequently the work is clamped upon the upper edge of the table 60, so that the operator may no longer control the position of the work.

When the table 60 commences to move upwardly the cam 89 thereon frees the lever 100, whereupon the counterweight 105a operates through the rod 106 to raise the arm 83 carrying the trip lever, this being thereby freed from the shoulder 87 so that it can turn until the shoulder 85 thereon makes contact with the member 82. As previously described herein the eccentric shaft makes half a revolution and then stops with the cylinders 23 in operation, since the stop motion disk 59 releases the clutch 28. The shaft 62 continues to rotate and the table consequently ascends further independently of the work supports 107 to engage and render operative the clamp bar 150, in the manner already described, and to feed the work by pulling it between the cylinders 23 and their respective work supports 107, the table finally reaching the end of its stroke as represented in Fig. 4. The work is thus brought into contact with the cylinders 23 by the work supports 107 so that it is bedded down in the supports (see Fig. 3) and preliminarily tensioned. Subsequently the table 60 pulls the work over the surface of the work supports 107 during continued operation of the cylinders 23, the tension being maintained throughout the putting-out operation, it being understood that the cylinders 23 operate upon opposite sides of the previously stretched backbone portion of the work. If the operator desires to repeat this operation on the work or any part thereof, he can reverse the movement of the table before it reaches the top of its stroke, by manipulation of the bar 99 previously referred to herein.

When the operation is completed and the table reaches the top of its stroke the cam 89 thereon puts the clutch 28 into action again by means of the lever 90 and intermediate connections so that the eccentric shaft completes the revolution and moves the cylinders 23 and the locking bar or bolt 123 to inoperative positions. The cam 71 also operates through the lever 72 and intermediate connections to throw out the clutch 64 and put the clutch 67 into action, whereupon the rotation of the shaft 62 is reversed and the table 60, clamp bar 150, and work supports 107 are returned to their initial positions of rest. The arrangement is such that the movement of the setting cylinders 23 to the inoperative position is in advance of the downward movement of the table. It is impossible to lower the table with the cylinders in the operative position.

Having thus described my invention, what I claim as new and desire to secure by Letters Patent of the United States is:

1. In a machine for operating upon hides, skins, leather, and other similar pieces of work, means comprising a table for supporting a piece of work, means for clamping the piece of work temporarily on the table, means for operating on the median longitudinal portion of the work while the latter is supported by the work supporting means, means for moving the clamping means and the table relatively to each other to free the work, provision being thus made so that the piece of work may be shifted to bring the treated portion over the edge of the table, and means for then completing the treatment of the work while it is backed upon opposite sides of the table.

2. In a machine for operating upon hides, skins, leather, and other similar pieces of work, means comprising a table for supporting a piece of work, a clamp member operative to clamp the piece of work temporarily on the table, a bladed member for operating upon the median longitudinal portion of the work upon the work supporting means, means for moving the clamp member and the bladed member away from the work to release the latter, provision being thus made so that the work may be shifted to bring the treated portion over the edge of the table, a pair of bladed members, and means for moving the table past the bladed members so that the untreated portions of the work may be operated upon by the bladed members while backed by the opposite sides of the table.

3. In a machine for operating upon hides, skins, leather, and other similar pieces of work, a table, a work support on each side of the table, a bladed cylinder for operating upon the median longitudinal portion of a piece of work supported by one of the work supports, means for moving the bladed cylinder to inoperative position to free the work, provision being thus made so that the work may be shifted to bring the treated portion over the table, a pair of bladed members, and means for causing the work supports to move into work-presenting relation to the bladed members and the table to move past the bladed members so that the latter may operate upon the untreated portions of the work while backed by the opposite sides of the table and while being spread out laterally through co-operation of the pair of bladed members and the work supports.

4. In a machine for operating upon hides, skins, leather and other similar pieces of work, work supporting means comprising a concave work supporting member, a bladed member for operating upon the median longitudinal portion of a piece of work while it is backed by the concave member to stretch said portion of the work in the direction of its length, means, comprising the same work supporting member, subsequently operative for putting-out and stretching the remaining portions of the piece of work, and means for causing movement of the work supporting member relative to both the bladed member and the putting-out and stretching means.

5. In a machine for operating upon hides, skins, leather and other similar pieces of work, work supporting means, means comprising a bladed cylinder for operating upon the median longitudinal portion of a piece of work while it is backed by a part of said work supporting means to stretch the said portion lengthwise thereof and to perform putting-out operations thereon, bladed members arranged to operate subsequently upon the remaining portions of the piece of work while supported by said work supporting means to stretch them in a direction at a right angle to the median portion and to put out the moisture progressively from the median portion to the side edges of the piece of work, means for causing movement of the work supporting means past both the bladed cylinder and the bladed members to secure putting-out and stretching operations on all parts of the work, power means for causing operation of the bladed members upon the work, and power means independent of the first-mentioned power means and arranged to be under the direct control of the operator for operating the bladed cylinder as that operation of the cylinder on the work may be continued in accordance with the judgment of the operator.

6. In a machine for operating upon hides, skins, leather, and other similar pieces of work, work supporting means, means for operating upon the median, longitudinal portion only of a piece of work while it is backed by said work supporting means, means for subsequently operating upon the remaining portions of the work while supported by said work supporting means, means for causing relative movement between the work supporting means and both of the means for operating on the piece of work to secure treatment of all portions of the work, power means for causing operation of the second-mentioned means for operating on the work, and power means independent of the first-mentioned power means and arranged to be under the control of the operator for causing repeated operations of the first-mentioned means upon a piece of work once introduced into the machine.

7. In a machine for operating upon hides, skins, leather and other similar pieces of work, means comprising a work support and a co-operating bladed member for operating first upon a median longitudinal portion of a piece of work, means for clamping the work against movement relative to the work support during operation of the first-mentioned means, bladed members for operating upon the remaining portions of the piece of work while supported by said work support, work supporting means comprising said work support movable for presenting the piece of work to the bladed members, and means for moving said work support to back portions of the work while being operated on in succession by the bladed member and bladed members.

8. In a machine for operating upon hides, skins, leather and other similar pieces of work, work supporting means, means for operating first upon the median longitudinal portion of a piece of work while backed by said work supporting means, and bladed members arranged to operate subsequently upon the remaining portions of the piece of work, while supported by said work supporting means, the latter comprising a table and work supports at each side of the table movable to present the piece of work to the bladed members, said table being arranged to move between and past the bladed members to present portions of the work successively for operation by the bladed members while the work supports press the work against the bladed members, one of said work supports being arranged to back the median longitudinal portion of the piece of work while it is being treated by the first-mentioned means for operating on the work.

9. In a machine for operating upon hides, skins, leather, and other similar pieces of work, means for operating first upon the median longitudinal portion of a piece of work, bladed members arranged to operate upon the remaining portions of the piece of work, a table, work supports on each side of the table, means for moving the table and the work supports to present the piece of work to the bladed members, and means for positioning the work supports and the bladed members in predetermined relation to each other to co-operate in spreading and tensioning operations upon the piece of work while the table continues in motion between the bladed members to present successive portions of the work thereto.

10. In a machine for operating upon hides, skins, leather, and other similar pieces of work, a table, a pair of work supports one on each side of the table all adapted to support a piece of work with the median longitudinal portion thereof resting over one of the work supports, a bladed cylinder for co-operation with one of the work supports to stretch and to put-out the median longitudinal portion of the work, a pair of bladed cylinders, means for moving the table and the work supports to present the piece of work to the cylinders with the median longitudinal portion of the work over the edge of the table, means for positioning the work supports in predetermined work-supporting relation to the bladed cylinders while the table continues in motion between and past the cylinders, and means for operating the cylinders in co-operative relation with the work supports to tension the piece of work and to cause the bladed cylinders to operate upon the work where it is backed by the table to perform putting-out operations upon portions of the work untreated by the first bladed cylinder.

11. In a machine for operating upon hides, skins, leather, and other similar pieces of work, a table, a work support adapted to support a piece of work with the median longitudinal portion thereof over the work support, a bladed cylinder movable into position to operate upon the median longitudinal portion of work positioned on the work support, a clamping member movable with the cylinder to clamp the piece of work upon the table to prevent displacement thereof during the operation of the cylinder, bladed cylinders for operating upon the remaining portions of the piece of work, means operating to move the first-mentioned cylinder and clamping member to inoperative position and the table into co-operative relation with respect to the bladed cylinders, said last mentioned means being operative to continue in motion between and past the cylinders to present all untreated portions of the work progressively thereto, and a clamping member for holding the piece of work against displacement during the operation of the bladed cylinders.

12. In a machine for operating upon hides, skins, leather, and other similar pieces of work, a table, a pair of work supports, one on each side of the table, a bladed cylinder movable into co-operative relation with respect to one of the work supports to operate upon a portion of the work, a clamping member movable with the bladed cylinder to clamp the work upon the table to prevent displacement thereon, a pair of bladed cylinders, means for moving the first-mentioned bladed cylinder and the clamping member to inoperative position, and simultaneously therewith causing movement of the table and work supports into co-operative relation with the bladed cylinders, means for stopping the work supports in predetermined relation with respect to the bladed cylinders and maintaining them there while the table continues to move between and past the bladed cylinders, and a second clamping means for preventing displacement of the work on the table during operation of the bladed cylinders.

13. In a machine for operating upon hides, skins, leather, and other similar pieces of work, a table, a pair of work supports one on each side of the table, a bladed cylinder for operating on the median longitudinal portion of a piece of work positioned over one of the work supports, a pair of bladed cylinders spaced from the first-mentioned cylinder, means for moving the first-mentioned cylinder to an inoperative position and simultaneously therewith effecting movement of the table and work supports into co-operative relation with respect to the pair of bladed cylinders, and means against which the work may be pressed to cause shifting of the piece of work to bring the central longitudinal portion thereof over the table prior to the presentation of the work to the pair of bladed cylinders.

14. In a machine for operating upon hides, skins, leather, and other similar pieces of work, a table, a pair of work supports one on each side of the table, a bladed cylinder for operating on the median longitudinal portion of a piece of work positioned over one of the work supports, a pair of bladed cylinders spaced from the first-mentioned cylinder, means for moving the first-mentioned cylinder to an inoperative position and simultaneously therewith effecting movement of the table and work supports into co-operative relation with respect to the pair of bladed cylinders, and a bar against which a piece of work may be pressed to hold the work during upward movement of the work supports, thereby causing shifting of the piece of work to bring the median longitudinal portion thereof over the upper edge of the table prior to presentation of the work to the pair of bladed cylinders.

15. In a machine for operating upon hides, skins, leather, and other similar pieces of work, a table for supporting a piece of work, means for operating upon a piece of work while it is supported by the table, means for moving the table past the last-mentioned means so that different portions of the work may be operated upon, a clamping member for holding the piece of work against displacement while it is being operated upon, and means controlled by the movement of the table to effect the application of the clamping means.

16. In a machine for operating upon hides, skins, leather, and other similar pieces of work, a table for supporting a piece of work, bladed members for operating upon a piece of work supported by the table, a clamping member normally in spaced relation to the table, means for moving the table between and past the bladed members and for moving the table and the clamping member relatively to each other to clamp the piece of work on the table, and means controlled by the movement of the table for increasing the clamping pressure of the clamping member.

17. In a machine for operating upon hides, skins, leather, and other similar pieces of work, a table for supporting a piece of work, bladed members for operating upon a piece of work supported by the table, a clamping member normally in spaced relation to the table, means for moving the table and the clamping member relatively to each other to clamp the work on the table, and means carried by the table and by the clamping member and arranged to co-operate with each other after contact of the table with the clamping member to force the clamping member into firm clamping relation with respect to the table.

18. In a machine for operating upon hides, skins, leather, and other similar pieces of work, a table for supporting a piece of work, bladed members for operating upon a piece of work supported by the table, a clamping member normally in spaced relation to the table, means for moving the table and the clamping member relatively to each other to clamp the work on the table, said means operating also to move the table and the clamping means past the bladed members, a guide for the clamping member and table, means carried by the clamping member and the table for co-operation with each other in effecting firm clamping of the work between the clamping member and the table, and a cam carried by the guide for effecting operation of the firm clamping means prior to the operation of the bladed members upon the work.

19. In a machine for operating upon hides, skins, leather, and other similar pieces of work, a table for supporting a piece of work, bladed members for operating upon a piece of work supported by the table, a clamping member normally in spaced relation to the table, means for moving the table and the clamping member relatively to each other to clamp work on the table, a guide for the table and for the clamping member, means carried separately by the clamping member and by the table for co-operation with each other in effecting firm clamping of the clamping member upon the table, and means supported stationarily upon the guide for effecting operation of the firm clamping means prior to the operation of the bladed members upon the work.

20. In a machine for operating upon hides, skins, leather, and other similar pieces of work, a table for supporting a piece of work, bladed members operating upon a piece of work supported by the table, a clamping member normally in spaced relation to the table, means for moving the table into contact with the clamping member, a guide for the table and the clamping member, means carried separately by the table and by the clamping member and arranged to come into co-operative relation with respect to each other upon contact of the table with the clamping member to increase the clamping pressure on the work on the table, and cam members carried by the guide for causing operation of the increase pressure clamping means prior to the operation of the bladed members upon the work.

21. In a machine for operating upon hides, skins, leather, and other similar pieces of work, a table for supporting a piece of work, bladed members operating upon a piece of work supported by the table, a clamping member normally in spaced relation to the table, means for moving the table into contact with the clamping member, guide members for the table and the clamping member, a shoulder or abutment at each end of the table, a hook member pivotally carried by the clamping member at each end thereof, and a cam in each guide member for causing the hooks to engage with the abutments on the table to draw the clamping member and the table into firm contact with the piece of work between them.

22. In a machine for operating upon hides, skins, leather, and other similar pieces of work, a table for supporting a piece of work, bladed members operating upon a piece of work supported by the table, a clamping member normally in spaced relation to the table, means for moving the table into contact with the clamping member, guide members for the table and the clamping member, a shoulder or abutment at each end of the table, and a hook member pivotally carried by the clamping member at each end thereof, each guide member having a recess and a cam surface operative to force the hooks into wedging engagement with the abutments on the table to draw the clamping member and table into firm contact with the piece of work between them.

23. In a machine for operating upon hides, skins, leather, and other similar pieces of work, a table for supporting a piece of work, bladed members operating upon a piece of work supported by the table, a clamping member normally in spaced relation to the table, means for moving the table into contact with the clamping member, guide members for the table and the clamping member, a shoulder or abutment at each end of the table, a hook member pivotally carried by the clamping member at each end thereof, each guide member having a recess and a cam surface operative to force the hooks into wedging engagement with the abutments on the table to draw the clamping member and table into firm contact with the piece of work between them, and a spring associated with each pivoted hook for causing it to release the associated abutment when the recess is reached upon the return movement of the table.

24. In a machine for operating upon hides, skins, leather, and other similar pieces of work, a pair of work supports, a pair of bladed cylinders normally in spaced relation to each other and to the work supports, means for moving the work supports into predetermined relation with respect to the cylinders to present a piece of work thereto, means for movably mounting the work supports, and means for equalizing the pressure between the work supports and the cylinders to accommodate variations in the thickness of the work.

25. In a machine for operating upon hides, skins, leather, and other similar pieces of work, a table, a work support on each side of the table, a pair of bladed cylinders normally in spaced relation to each other and to the table and work supports, means for moving the table and work supports into predetermined relation with respect to the cylinders to present a piece of work thereto, means for pivotally mounting the work supports, and means associated with the pivotal mounting means of the work supports for equalizing the pressure between the work supports and their co-operating cylinders.

26. In a machine for operating upon hides, skins, leather, and other similar pieces of work, a pair of bladed cylinders, a table, a pair of work supports one on each side of the table and normally in spaced relation to the cylinders so that a piece of work may be thrown over the table and work supports, means for moving the table and work supports into predetermined relation with respect to the cylinders, a pair of members each pivotally mounted and operative to support one of the work supports, and means for moving the bladed cylinders yieldingly toward each other to engage the work on opposite sides of the table, said pivotal supporting members having extensions adapted to engage with the cylinders upon upward movement of the work supports to locate the latter in proper alinement each with respect to its co-operating cylinder.

27. In a machine for operating upon hides, skins, leather, and other similar pieces of work, a pair of bladed cylinders, a table, a pair of work supports one on each side of the table and normally in spaced relation to the cylinders so that a piece of work may be thrown over the table and work supports, means for moving the table and work supports into predetermined relation with respect to the cylinders, a pair of members each pivotally mounted and operative to support one of the work supports, a beam at each end of the machine upon which the pivoted supporting members are pivoted, means for yieldingly connecting the lower ends of the supporting members, and means for pivotally supporting the beams, the construction and arrangement being such that the work supports may adjust themselves to the thickness of the work between them and the bladed cylinders through the pivoted beams and pivoted supporting members and the yielding connection between the supporting members.

28. In a machine for operating upon hides, skins, leather, and other similar pieces of work, a table over which a piece of work may be thrown, a pair of work operating members spaced with respect to the table and movable toward and from each other into and out of operative relation with respect to the work on opposite sides of the table, and means for yieldingly moving the work operating members into contact with the work on the table, the said means being operative also to move the work operating members to inoperative position and to lock them in the last-mentioned position.

29. In a machine for operating upon hides, skins, leather, and other similar pieces of work, a table over which a piece of work may be thrown, a pair of bladed members spaced with respect to the table and movable toward and from each other into and out of operative relation with respect to the work on opposite sides of the table, a toggle mechanism for yieldingly moving the bladed members into operative position and for retracting them to inoperative position, said toggle mechanism comprising a link for operating the toggle, said link being movably mounted to permit bodily movement of the toggle and of the bladed members while the latter are in operative position, and means arranged to hold the same link against such movement as would permit movement of the bladed members while the latter are in inoperative position.

30. In a machine for operating upon hides, skins, leather, and other similar pieces of work, a table over which a piece of work may be thrown, a pair of bladed cylinders spaced with respect to the table and movable toward and from each other into and out of operative relation with respect to the work on opposite sides of the table, and a toggle mechanism for yieldingly moving the bladed cylinders into operative position and for retracting the bladed cylinders to inoperative position, said toggle mechanism comprising a link for straightening and breaking the toggle, said link having a pivotal mounting, a guide for the link, and means for reciprocating the link to cause alternately straightening and breaking of the toggle, the construction and arrangement being such that with the toggle straightened the mounting for the link is outside of the guide so that the link will move pivotally to permit yielding of the bladed cylinders with respect to the table and the work thereon while, with the toggle broken, the link is retracted within the guide and is thereby locked against pivotal movement so that the bladed cylinders are held rigidly while in their inoperative positions.

31. In a machine for operating upon hides, skins, leather, and other similar pieces of work, a pair of bladed cylinders, a table and a work support on each side of the table all spaced with respect to the cylinders so that a piece of work may be thrown over the table and the work supports, means for moving the table and work supports into predetermined relation with respect to the cylinders, and means for locking the work supports in said predetermined relation while the table continues to move past the bladed cylinders to present successive portions of the work thereto.

32. In a machine for operating upon hides, skins, leather, and other similar pieces of work, a pair of bladed cylinders, a table and a work support on each side of the table all spaced with respect to the cylinders so that a piece of work may be thrown over the table and the work support, means for moving the table and work supports into predetermined relation with respect to the cylinders, and means controlled by the table for locking the work supports in said predetermined relation.

33. In a machine for operating upon hides, skins, leather, and other similar pieces of work, a pair of bladed cylinders, a table and a work support on each side of the table all spaced with respect to the cylinders so that a piece of work may be thrown over the table and the work supports, means for moving the table and work supports into predetermined relation with respect to the cylinders, and cam means carried by the table for causing locking of the work supports in said predetermined relation.

34. In a machine for operating upon hides, skins, leather, and other similar pieces of work, a pair of bladed cylinders, a table and a work support on each side of the table all spaced with respect to the cylinders so that a piece of work may be thrown over the table and the work supports, means for moving the table and work supports into predetermined relation with respect to the cylinders, means for locking the work supports in said predetermined position, and cam means carried by the table for causing operation of the locking means.

35. In a machine for operating upon hides, skins, leather, and other similar pieces of work, a pair of bladed cylinders, a table and a work support on each side of the table all spaced with respect to the cylinders so that a piece of work may be thrown over the table and the work supports, means for moving the table and work supports into predetermined relation with respect to the cylinders, a locking bar arranged to be projected beneath the work supports to lock them in said predetermined position, and means controlled by the table for causing the operation of the locking bar.

36. In a machine for operating upon hides, skins, leather, and other similar pieces of work, a pair of bladed cylinders, a table and a work support on each side of the table all spaced with respect to the cylinders so that a piece of work may be thrown over the table and the work supports, means for moving the table and work supports into predetermined relation with respect to the cylinders, a locking bar arranged to be projected beneath the work supports to lock them in said predetermined position, and a movable cam mounted on the table for causing operation of the locking bar.

37. In a machine for operating upon hides, skins, leather, and other similar pieces of work, a pair of bladed cylinders, a table and a work support on each side of the table all spaced with respect to the cylinders so that a piece of work may be thrown over the table and the work supports, means for moving the table and work supports into predetermined relation with respect to the cylinders, a locking bar arranged to be projected beneath the work supports to lock them in said predetermined position, and a cam pivoted on the table for causing operation of the locking bar, the said pivoted cam being movable to permit unobstructed descent of the table.

38. In a machine for operating upon hides, skins, leather, and other similar pieces of work, a cylinder for operating on a piece of work, a work support normally spaced from the cylinder so that a piece of work may be thrown thereover, said cylinder being bodily movable with respect to the work support, means for moving the work support into predetermined relation to the cylinder, means for locking the work support in said predetermined relation, and means controlled by the cylinder for unlocking the work support.

39. In a machine for operating upon hides, skins, leather, and other similar pieces of work, a bladed cylinder for operating on a piece of work, a work support normally in spaced relation to the cylinder so that a piece of work may be introduced over the work support, means for moving the work support into predetermined relation with respect to the cylinder, said means comprising a friction member, means movable simultaneously with the work support for controlling the friction member, and means for locking the work support in its operative position.

40. In a machine for operating upon hides, skins, leather, and other similar pieces of work, a cylinder for operating on a piece of work, a table and a work support movable between work receiving and work presenting positions, means for moving the work support into predetermined relation with respect to the cylinder, said means comprising a friction member, means movable simultaneously with the work support for terminating upward movement of the latter, and means controlled by the table for locking the work support in its presenting position.

41. In a machine for operating upon hides, skins, leather, and other similar pieces of work, a cylinder for operating on a piece of work, a table and a work support movable between work receiving and work presenting positions, means for moving the work support into predetermined relation with respect to the cylinder, said means comprising a friction member, a member for counterbalancing the weight of the table operative also to render the friction member inoperative at a predetermined point in the upward movement of the work support, a locking bar for locking the work support in work presenting position, and cam means carried by the table for controlling the operation of the locking bar.

42. In a machine for operating upon hides, skins, leather, and other similar pieces of work, a pair of cylinders for operating on a piece of work, a table normally spaced with respect to the cylinders and adapted to support a piece of work, means for moving the cylinders toward each other into operative position, and away from each other into inoperative position, means for moving the table continuously between the cylinders so that the latter may operate upon the work upon opposite sides of the table, and means for reversing the movement of the table at the will of the operator so that any given portion of the work may be repeatedly operated upon, said last-mentioned means being operative to cause cylinders to move to inoperative position before reversing movement of the table takes place.

43. In a machine for operating upon hides, skins, leather, and other similar pieces of work, a pair of cylinders for operating on a piece of work, a table normally spaced with respect to the cylinders and adapted to support a piece of work, means for moving the cylinders toward each other into operative position, and away from each other into inoperative position, means for moving the table continuously between the cylinders so that the latter may operate upon the work upon opposite sides of the table, and means controlled by the table for reversing the movement of the latter to return the table to its initial position of rest, said means being operative to cause movement of the bladed cylinders to inoperative position prior to the reversing movement of the table.

44. In a machine for operating upon hides, skins, leather, and other similar pieces of work, a table, a work support on each side of the table, a single cylinder movable into and out of co-operative relation with respect to one of the work supports, a pair of cylinders for operating on the work upon opposite sides of the table, power means for moving the cylinders, the table and the work supports, and a treadle for controlling the power means, the said power means being arranged to cause upon one depression of the treadle, the single cylinder to move to cooperate with one of the work supports to operate upon the portion of work on that work support, and said power means being further arranged to cause, upon the second operation of the same treadle, the single cylinder to move to inoperative position and simultaneously therewith the table and work supports to move into predetermined relation to the pair of cylinders for the completion of the operation upon the remaining portions of the piece of work.

45. In a machine for operating upon hides, skins, leather, and other similar pieces of work, a pair of cylinders for operating on a piece of work, a table normally spaced from the cylinders while in its initial position of rest so that a piece of work may be thrown thereover, means for moving the table between the cylinders at a predetermined rate so that the cylinders may operate progressively upon portions of the work upon opposite sides of the table, said power means comprising clutches, and means carried by the table for controlling the clutches for causing reverse movement of the table after it has reached a predetermined point in its movement above the cylinders and for disconnecting the power means after it has reached its initial position at the end of its reversing movement.

46. In a machine for operating upon hides, skins, leather, and other similar pieces of work, a work support having a concave surface for supporting a piece of work, a bladed cylinder for operating upon a piece of work while it is supported by the concave surface of the work support to effect putting-out operations upon the work on the table, a work-clamping member arranged to be positioned below the work when the latter is on the work support, said work-clamping member having a convexly shaped clamping surface, and a second work-clamping member movable for co-operation with the first-mentioned clamping member before the operation of the cylinder, said second clamping member having a concave surface for effective co-operation with the convexly curved surface of the first clamping member.

47. In a machine for operating upon hides, skins, leather, and other similar pieces of work, a support for a piece of work, a bladed cylinder for operating upon a piece of work supported by the work support, said cylinder being movable toward and from the work support, a work clamping member independent of the work support, and a clamping member movable with the cylinder into and out of clamping relation with respect to first-mentioned work clamping member.

48. In a machine for operating upon hides, skins, leather, and other similar pieces of work, means for supporting a piece of work comprising a yieldable member and a member having a concave surface, means for yieldingly supporting the first-named member independently of the second member, a bladed cylinder for operating upon a piece of work backed by the concave surface, and a clamping member normally in spaced relation to the work supporting means and movable to clamp the piece of work in co-operation with the yieldable member.

49. That improvement in methods of putting-out hides, skins, and pieces of leather, which comprises putting-out the median longitudinal portion of the work and stretching it in the direction of its length, shifting the piece of work so as to utilize the treated portion as a line of support for the untreated portions, placing the untreated portions under tension upon each side of the line of support, and putting-out the untreated portions progressively from the median portion to the edges of the work on both sides of the median portion, and simultaneously therewith stretching the last-mentioned portions along lines extending transversely of the said median portion.

In testimony whereof I have signed my name to this specification.

GUSTAV A. SCHETTLER.